(12) United States Patent
Narasimhan et al.

(10) Patent No.: US 11,765,020 B2
(45) Date of Patent: Sep. 19, 2023

(54) SYSTEMS AND METHODS FOR ROUTING NETWORK MESSAGES

(71) Applicant: MASTERCARD INTERNATIONAL INCORPORATED, Purchase, NY (US)

(72) Inventors: Prasanna Srinivasan Narasimhan, O'Fallon, MO (US); Ragunath Venkatapathy, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 2 days.

(21) Appl. No.: 17/411,913

(22) Filed: Aug. 25, 2021

(65) Prior Publication Data

US 2022/0070055 A1    Mar. 3, 2022

Related U.S. Application Data

(60) Provisional application No. 63/070,685, filed on Aug. 26, 2020.

(51) Int. Cl.
| | |
|---|---|
| *G06F 15/173* | (2006.01) |
| *H04L 41/0686* | (2022.01) |
| *H04L 41/147* | (2022.01) |
| *H04L 47/2475* | (2022.01) |
| *H04L 41/16* | (2022.01) |
| *H04L 41/0681* | (2022.01) |

(52) U.S. Cl.
CPC ...... *H04L 41/0686* (2013.01); *H04L 41/0681* (2013.01); *H04L 41/147* (2013.01); *H04L 41/16* (2013.01); *H04L 47/2475* (2013.01)

(58) Field of Classification Search
CPC ............ H04L 41/0686; H04L 41/0681; H04L 41/147; H04L 41/16; H04L 47/2475
See application file for complete search history.

(56) References Cited

U.S. PATENT DOCUMENTS

| 5,355,516 A | * | 10/1994 | Herold | ................. | H04W 28/06 455/450 |
| 8,055,287 B1 | * | 11/2011 | Upadhyay | ............... | H04W 4/14 455/412.2 |
| 11,138,033 B1 | * | 10/2021 | Sem | ......................... | G06F 9/54 |

(Continued)

*Primary Examiner* — Padma Mundur
(74) *Attorney, Agent, or Firm* — Harness, Dickey & Pierce, P.L.C.

(57) ABSTRACT

Networks and methods are provided for use in directing retry requests for content based on intervals to retry defined by network conditions. One example method generally includes receiving, from a computing device, an application programming interface (API) request for content and determining whether the API request exceeds a predefined rate limit of API requests. The method then includes, in response to the API request exceeding the predefined rate limit, calculating a retry interval for the API request based on the predefined rate limit of API requests and a number of expected API requests for an upcoming interval, appending the retry interval to a failure notice, and transmitting the failure notice to the computing device thereby indicating to the computing device to retry the API request based on the retry interval rather than immediately or rather than at another preset interval of the computing device.

12 Claims, 4 Drawing Sheets

(56) References Cited

U.S. PATENT DOCUMENTS

| | | | | |
|---|---|---|---|---|
| 2007/0121502 | A1* | 5/2007 | Donovan | H04L 47/17 370/235 |
| 2011/0082947 | A1* | 4/2011 | Szeto | H04L 63/0218 709/232 |
| 2014/0215081 | A1* | 7/2014 | Cili | H04W 76/18 709/227 |
| 2015/0146522 | A1* | 5/2015 | Lau | H04W 28/0284 370/230 |
| 2015/0341822 | A1* | 11/2015 | Ma | H04W 28/18 455/456.1 |
| 2017/0083852 | A1* | 3/2017 | Adler | G06Q 10/0631 |
| 2017/0187782 | A1* | 6/2017 | Crawford | H04L 67/565 |
| 2019/0268442 | A1* | 8/2019 | Puniani | G06F 9/547 |
| 2021/0084670 | A1* | 3/2021 | Chauhan | H04L 65/80 |
| 2021/0382957 | A1* | 12/2021 | Kaur | G06F 16/9537 |
| 2022/0019482 | A1* | 1/2022 | Jiang | G06N 20/00 |

\* cited by examiner

SYSTEMS AND METHODS FOR ROUTING NETWORK MESSAGES

CROSS-REFERENCE TO RELATED APPLICATION

This application claims the benefit of, and priority to, U.S. Provisional Application No. 63/070,685, filed Aug. 26, 2020. The entire disclosure of the above application is incorporated herein by reference.

FIELD

The present disclosure generally relates to systems and methods for use in routing network messages, including imposing retry limitations on network messages in connection with network traffic conditions.

BACKGROUND

This section provides background information related to the present disclosure which is not necessarily prior art.

Network-based content is often delivered to users at devices associated with the users. In so doing, the content may be delivered in response to requests from the users for such content. For example, a network request from a user's network browser may be coordinated through a domain name system (DNS), which provides a unique Internet Protocol (IP) address in response to the request (e.g., www-.mastercard.com, etc.). When the user device receives the IP address, the network browser accesses a domain via the IP address and, specifically, content provided from the domain. In connection therewith, it is known to employ certificates at the DNS to ensure that the user device and/or user browser is authenticated in connection with the request to access the domain.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Networks provide a variety of services, which often relate to delivery of content to users (and their devices). The content depends on the particular network, whereby a payment network, for example, may provide content related to payment account transactions, etc. In connection therewith, both the content and the timeliness of the content may be important. When a request for content fails, in such a network, the request may be retried over and over until the requested content is delivered. As such, when a condition occurs in a network (e.g., an outage, etc.), a high traffic condition may exist upon return of the network (or segments thereof). The high traffic condition may compound the issues associated with the condition and result in other outages to various content provided from the network.

Uniquely, the systems, networks and methods herein provide for limiting requests to the network under certain conditions, thereby alleviating the potential strain on the network following an outage or other disruption of the network (whereafter traffic bursts may be less likely). In particular, an edge device relies on present and predicted traffic parameters (i.e., conditions) to provide intervals to retry certain content requests (defined by the conditions), and to delay the retry requests to appropriate times. In this manner, upon a failed request (e.g., for various reasons, etc.), a user device is instructed to retry the failed request later at dynamic intervals, rather than immediately, to inhibit buildup of traffic and repeated, immediate failed requests for the content.

Figure 1:
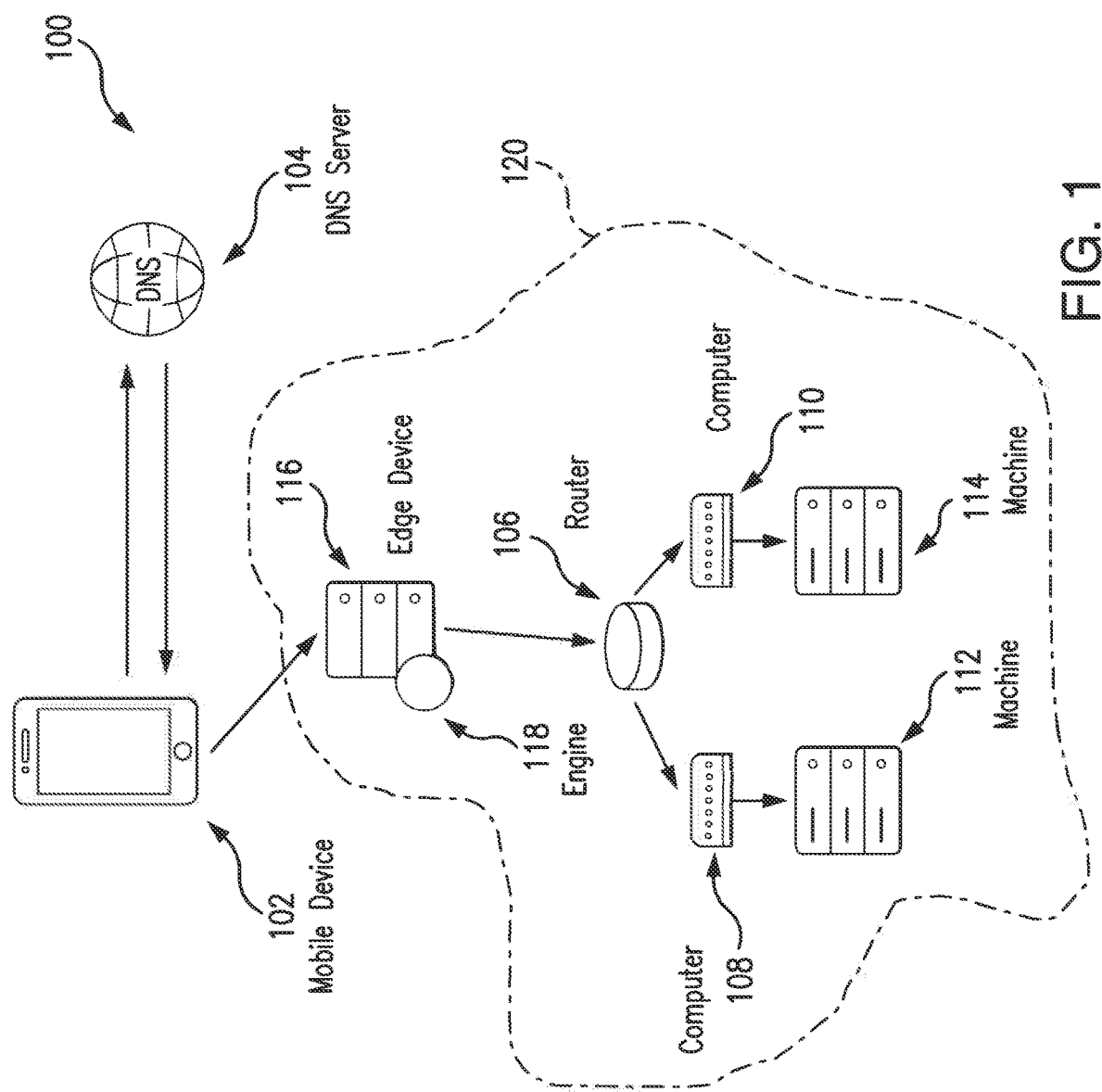
FIG. 1 is a block diagram of an example system of the present disclosure, which includes a network configured to direct retry requests for network content based on intervals defined by one or more network conditions.

FIG. 1 illustrates an example system 100 in which one or more aspects of the present disclosure may be implemented. Although parts of the system 100 are presented in one arrangement, it should be appreciated that other example embodiments may include the same or different parts arranged otherwise, for example, depending on networks and/or content involved, authentication of requests to networks, types and architectures of networks (e.g., payment networks, etc.), etc.

As shown in FIG. 1, the illustrated system 100 generally includes a plurality of computing devices (e.g., a mobile device 102, a domain name system (DNS) server 104, computers 108 and 110, machines 112 and 114, and an edge device 116, etc.) coupled to one another through one or more networks (e.g., as generally indicated by the arrowed lines, etc.). The network(s) may each include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof.

In general, in the system 100, a number of the computing devices identified above form a network 120, designated by the dotted line, which provides services to the mobile device 102, for example, and other devices. The network 120 is generally associated with a domain (e.g., www.mastercard-.com, etc.), whereby the mobile device 102 is permitted to direct requests, and in particular, API requests, to the network 120. The network 120 may include for example, a payment network, such as, for example, the Mastercard™ payment network, etc. configured to process network transactions (e.g., payment account transactions, etc.) to accounts (e.g., payment accounts, etc.), where the network transactions generally involve two or more entities (e.g., consumers and merchants, etc.). In connection therewith, the mobile device 102, for example, is permitted to submit requests for transaction related data (or content) to the network 120. That said, it should be appreciated that the particular type of the network 120 may be different in other system embodiments and is not limited to a payment network.

The machines 112 and 114 (or machine computing devices) of the network 120 each include virtual machines, which in this example (where the network 120 includes a payment network) are part of the payment network or a banking institution associated therewith (e.g., forming part of a data center for the same, etc.) and are suitable to provide data to and/or interact with a virtual wallet application (e.g., at the mobile device 102, etc.), or otherwise. The virtual machines 112 and 114 may be physically collocated in one place or region, or separated geographically (e.g., the machines 112 and 114 may be separate data centers, etc.), whereby the virtual machines 112 and 114 may provide redundancy. In particular, in this example, the machines 112 and 114 are Java™ Virtual Machines (JVM), configured to provide content in response to API calls from the virtual wallet application or associated backend systems, etc.

In addition, each of the virtual machines 112 and 114 is associated with a respective one of the computers 108 and 110, which are each configured to relay requests from router 106 to the respective one of the virtual machines 112 and 114. The computers 108 and 110 may be, in this embodiment, F5 computers, which are included, for example, as part of a security layer for the machines 112 and 114, etc. That said, F5 computers may include, for example, internal load balancing computers that employ different routing algorithms and policies, configured by the network 120, to address Internet protocol based requests (e.g., TCP, HTTP, etc.).

The router 106 of the network 120 is disposed between the edge device 116 (i.e., the edge computing device) and the computers 108 and 110. The router 106 is configured to provide, for example, load balancing between the virtual machines 112 and 114. It should be appreciated that any different variety of load balancing techniques or other rules associated with traffic flow to the virtual machines 112 and 114 may be employed in the router 106 to distribute traffic (e.g., to distribute API requests or calls for content, etc.), as described below, to the virtual machines 112 and 114.

Apart from the network 120, the system 100 includes the mobile device 102, which may include, for example, a smartphone, a tablet, etc. While referred to as being mobile in this example embodiment, the mobile device 102 may include a non-mobile device in other embodiments, such as a server or personal computer, etc., which is not generally transported with a user. In this example embodiment, the mobile device 102 includes a virtual wallet application (associated with the virtual wallet referred to above) such as, for example, PayPass™ from Mastercard™, ApplePay™ from Apple, PayWave™ from Visa, GooglePay by Google, etc. In general, the virtual wallet application relies on API calls, or more generally, requests, to the network 120 to initiate and/or participate in payment account transactions or to provide other associated operations, etc.

Finally, in the system 100, the DNS server 104 is configured to convert domain names into Internet Protocol (IP) addresses. It should be appreciated that the DNS server 104 may be a different type of computing device in other system embodiments, but will generally be configured to provide an address of the edge device 116, for example, and facilitate certificate verification and/or authentication of a user device (e.g., the mobile device 102, etc.), as described below. In addition, new slots may be provisioned for each domain name created in the DNS server 104 and then configured with SSL security certificates to secure transactions between clients and servers. In connection therewith, the SSL security certificates may be renewed periodically based on preconfigured expiration timeframes, to ensure validation information is accurate and up to date, and that security keys are rotated, etc. While only one DNS server 104 is illustrated in FIG. 1, it should be appreciated that the system 100 may include multiple DNS server's (e.g., a recursive DNS server and an authoritative DNS server, etc.). In one specific embodiment, a payment network may employ a DNS server and rely on a third party (e.g., a cloud service, etc.) to provide a second DNS server for a given domain. What's more, it should be appreciated that the DNS server 104 may be included in the network 120 of the system 100 in some implementations.

In view of the above, in the example system 100, the user associated with the mobile device 102 initiates a transaction with a merchant, whereby a notification is provided to the wallet application at the mobile device 102. The notification is generally associated with the transaction but does not include details of the transaction. In turn, the mobile device 102 is configured, by the virtual wallet application, to retrieve transaction detail information from the network 120 (based on the notification). In particular, the mobile device 102 is configured to make an API request to the network 120 for such detail information. The request is initially directed to the DNS server 104 (e.g., as a call to mdes.mastercard.com, etc.). Upon receipt, the DNS server 104 is configured to provide the IP address corresponding to the domain name and to provide the IP address and an associated certificate for the IP address back to the mobile device 102.

In response, the mobile device 102 is configured, by the virtual wallet application, to verify the certificate and, once verified, submit the API request for the transaction data to the IP address, via the network 120.

In the illustrated system 100, the API request from the mobile device 102 is received at the edge device 116 of the network 120. The edge device 116 may include an API gateway, which is specific to one or more particular API calls or services. In this example embodiment, the API gateway is specific to a get_transaction API call for getting details associated with a transaction. The API gateway (or broadly, the edge device 116) may be configured to have a predefined rate limit of fifty thousand (50,000) API requests per second. It should be appreciated that a different predefined rate limit may be set in other system embodiments, often based on the particular capabilities of hardware and/or architecture of/in the edge device 116 and/or a number of API's and/or services handled through the edge device 116, etc. It should also be appreciated that when the rate limit is exceeded, the edge device 116 is configured to respond with a failure notice to the mobile device 102 (e.g., a 429-error notice, etc.).

Upon receipt of the API request from the mobile device 102, and when the rate limit of the edge device 116 is not exceeded, the edge device 116 is configured to pass the API request to the router 106. The router 106, in turn, is configured to push the API request to the machine 112, via the computer 108, or to the machine 114, via the computer 110, depending on conditions of the network 120 and/or rules associated with traffic to the virtual machines 112 and 114, etc. The virtual machine 112, for example, is configured to receive the request in this example, to collect the requested transaction data in response to the request, and then to provide a response to the API request, generally, including the requested transaction data.

However, when the API request exceeds the predefined rate limit of the edge device 116 (or the request fails for some other reason (e.g., a network outage, etc.)), the edge device 116 is configured to issue a failure notice for the API request to the mobile device 102. Uniquely, in this example embodiment, to avoid or inhibit a ramp up of API request retries (which, conventionally, are automatic and immediate from the mobile device 102), when the predefined rate limit is exceeded (e.g., as a result of an outage or other disruption to the handling of API requests, etc.), the edge device 116 is configured to generate an interval to retry the API request (or a 'retry after interval' or a retry interval for the API request). The edge device 116 is then configured to append the interval to retry to the failure notice (e.g., in a header of a 429-error notice, etc.) transmitted to the mobile device 102. In response, the mobile device 102 is configured to wait a period consistent with the interval prior to retrying the API request. That said, an example of when the API request from the mobile device 102 may exceed the predefined rate limit of the edge device 116 includes where a failure notice issued by the edge device 116 is delayed in transmission back to the mobile device 102 (and/or where multiple such failure notices are delayed in transmission back to multiple devices) whereby the mobile device 102 (and/or the other devices) continues in retrying the API request resulting in multiple additional and continuous requests (in excess of the rate limit for the edge device 116) (e.g., whereby a burst may potentially occur upon subsequent availability of the edge device 116 that overwhelms the edge device 116, etc.). Another example of when the API request from the mobile device 102 may exceed the predefined rate limit of the edge device 116 includes where a notification for a transaction (e.g., an indication that the API request was successful, etc.) issued by the edge device 116 is delayed in transmission to the mobile device 102 whereby the mobile device 102 continues in retrying the API request resulting in multiple additional and continuous requests (in excess of the rate limit for the edge device 116). A further example of when the API request from the mobile device 102 may exceed the predefined rate limit of the edge device 116 includes where numerous wallet transactions occur in a short interval of time, such that numerous API requests are submitted to the edge device 116 in a short interval of time (in excess of the rate limit for the edge device 116).

In connection with the above, the edge device 116 is configured, by engine 118 (e.g., formed of computer executable instructions, etc.), to generate the interval to retry as a dynamic interval based on conditions of the network 120 (and the machines 112 and 114, etc.). Specifically, in this embodiment, the edge device 116 is configured to determine a rate limit, a number of API requests received presently, both original and retries (e.g., new, second, third, etc.), and an expected number of API requests for a coming interval (e.g., based on prior intervals to retry, etc.). Based on these inputs, and potentially others, the edge device 116 is configured, by the engine 118, to employ machine learning in order to determine an interval to retry for the API request from the mobile device 102 that is expected to satisfy the rate limit on API requests to the network 120. In particular, the engine 118 may be configured employ time series forecasting models, including a piecewise linear growth curve trend with yearly-seasonal and weekly-seasonal components to predict future availability of the network 120 and to dynamically calculate the optimized retry interval for the mobile device 102 to send (or resend) an API request (e.g., a get_transaction API request, etc.). As such, the interval to retry is based on the conditions of the network 120 and is generally not a static interval. It should be appreciated that the edge device 116 may be configured to generate the interval to retry regularly or constantly, or potentially only when API requests exceed the predefined rate limit, etc. Regardless, as indicated above, when the edge device 116 determines the interval to retry, the edge device 116 is configured to append the interval to retry to the failure notice and to provide the failure notice with the interval to retry to the mobile device 102.

It should be appreciated that thousands, tens of thousands, or hundreds or thousands of API requests are generally handled by the network 120 for a given period of time, whereby the above may be repeated rapidly for API request in excess of the predefined rate limit for the edge device 116 (or API gateway therein). In connection therewith, the interval to retry may be determined at one or more intervals (e.g., every second, every five seconds, every minute, etc.) and applied to multiple API requests, from multiple devices, in excess of the predefined rate limit for the network 120 (and the edge device 116), or in some implementations, may be determined, per API request, etc.

That said, Table 1 includes an example snapshot of actual incoming API requests (e.g., first API requests and retry API requests inclusive, etc.) to the network 120 at various time intervals (e.g., 15 second intervals, etc.) and predicted API requests for the same time intervals.

TABLE 1

| Timestamp | Predicted No. of API Requests | Actual No. of API Requests |
| --- | --- | --- |
| 12:10:00 | 12559 | 13387 |
| 12:10:15 | 12422 | 12538 |
| 12:10:30 | 12305 | 12453 |
| 12:10:45 | 12427 | 12488 |
| 12:11:00 | 13387 | 12559 |
| 12:11:15 | 13490 | 14000 |
| 12:11:30 | 13509 | 14000 |
| 12:11:45 | 13367 | 13427 |
| 12:12:00 | 12472 | 13387 |

In the example snapshot of Table 1, the actual numbers of API requests are the numbers of request actually observed at the edge device 116 of the network 120 per given time interval (or timestamp) (i.e., per the identified 15 second interval). The predicted number of API requests, then, for each timestamp is based on historic trends of API requests to the network 120, including hourly, daily, weekly, monthly, and yearly trends from historic observations (e.g., from previous timestamps, etc. accumulated in buckets of 45 seconds, etc.; etc.), as well as seasonal impacts, etc. In connection therewith, machine learning techniques may be applied to build the time series predictions for the numbers of predicted API requests (per interval) included in Table 1. For example, the engine 118 may be configured employ techniques such as Seasonal Autoregressive Integrated Moving-Average (SARIMA), Holt Winter's Exponential Smoothing (HWES), Univariate Multilayer Perceptron for time series forecasting, Univariate Convolutional Neural Networks, Univariate Cony. Long Short-Term Memory (LSTM), variations thereof, or other suitable algorithms, etc. to generate the predictions per interval (e.g., based on the historic request numbers, etc.). In this way, the actual observed API requests are used as input (to the machine learning techniques) (at least in part) to determine the numbers for the predicted API requests at the timestamps.

While the system 100 includes a specific arrangement of devices in the network 120, as described above, it is contemplated that other system embodiments may include a different arrangement of computing devices, whereby an interval to retry may still be provided to a computing device to gain the benefits of the present disclosure.

Figure 2:
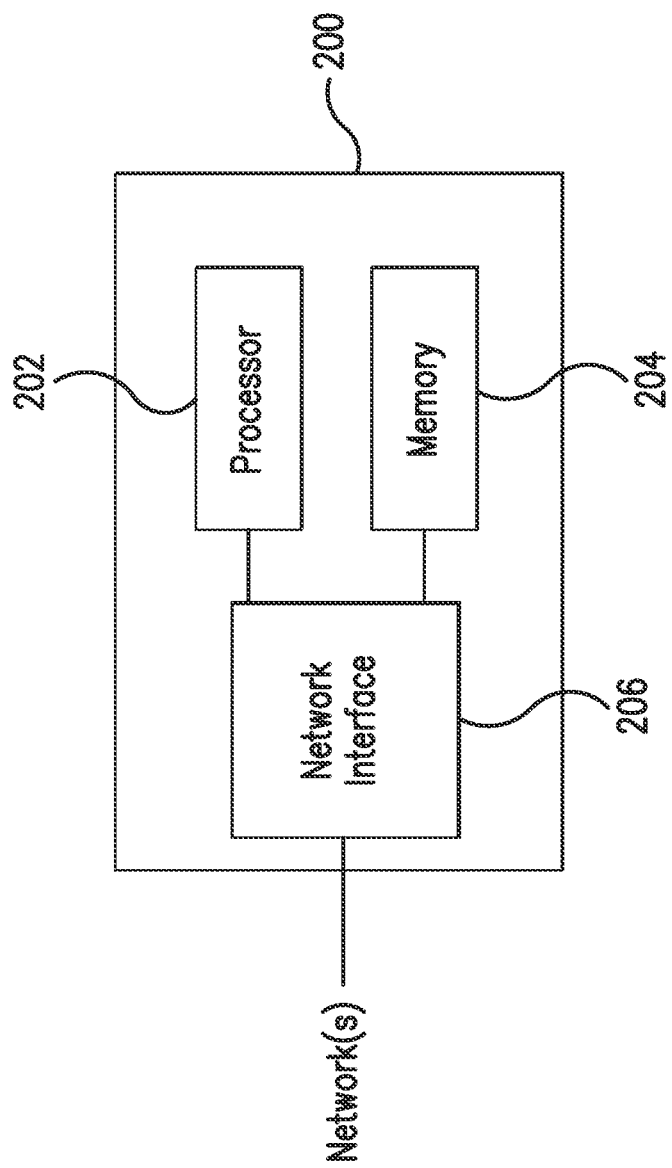
FIG. 2 is a block diagram of an example computing device that may be used in the system illustrated in FIG. 1.

FIG. 2 illustrates example computing device 200, which is suitable for use in the system 100. By way of example (and without limitation), the example computing device 200 may include one or more servers, workstations, computers, routers, gateways, or combinations thereof, etc., as appropriate. In the system 100 (of FIG. 1), the mobile device 102, the DNS server 104, the router 106, the computers 108 and 110, the machines 112 and 114, and the edge device 116 are each associated with, or implemented in, a computing device consistent with computing device 200. It should also be understood that different parts and/or arrangements of parts may be used in other computing devices. Furthermore, in various example embodiments, the computing device 200 may include multiple computing devices located in close proximity or distributed over a geographic region.

With reference to FIG. 2, the illustrated computing device 200 generally includes a processor 202, and a memory 204 that is coupled to the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above examples are example only and are not intended to limit in any way the definition and/or meaning of processor.

The memory 204, as described herein, is one or more devices that enable information, such as executable instructions and/or other data, to be stored and retrieved. The memory 204 may include one or more computer-readable storage media, such as, without limitation, dynamic random access memory (DRAM), static random access memory (SRAM), read only memory (ROM), erasable programmable read only memory (EPROM), solid state devices, CD-ROMs, tapes, flash drives, hard disks, and/or any other type of volatile or nonvolatile physical or tangible computer-readable media. The memory 204 may be configured to store, without limitation, transaction data, certificates, API request statistics, and/or any other types of data suitable for use as described herein, etc. Furthermore, in various embodiments, computer-executable instructions may be stored in the memory 204 for execution by the processor 202 to cause the processor 202 to perform one or more of the functions described herein (e.g., one or more of the operations of method 300, etc.), such that the memory 204 is a physical, tangible, and non-transitory computer-readable storage media and whereby the computing device 200 may be transformed into a special purpose computing device upon performing one or more of such operations. It should be appreciated that the memory 204 may include a variety of different and/or separate memories, each implemented in one or more of the functions or processes described herein.

In addition, the illustrated computing device 200 includes a network interface 206 coupled to the processor 202 (and, in some embodiments, to the memory 204 as well). The network interface 206 may include, without limitation, a wired network adapter, a wireless network adapter, a telecommunications adapter, or other device capable of communicating to one or more different networks (e.g., one or more of the networks in the system 100, etc.). In some example embodiments, the computing device 200 includes one or more network interfaces 206 incorporated into or with the processor 202.

Figure 3:
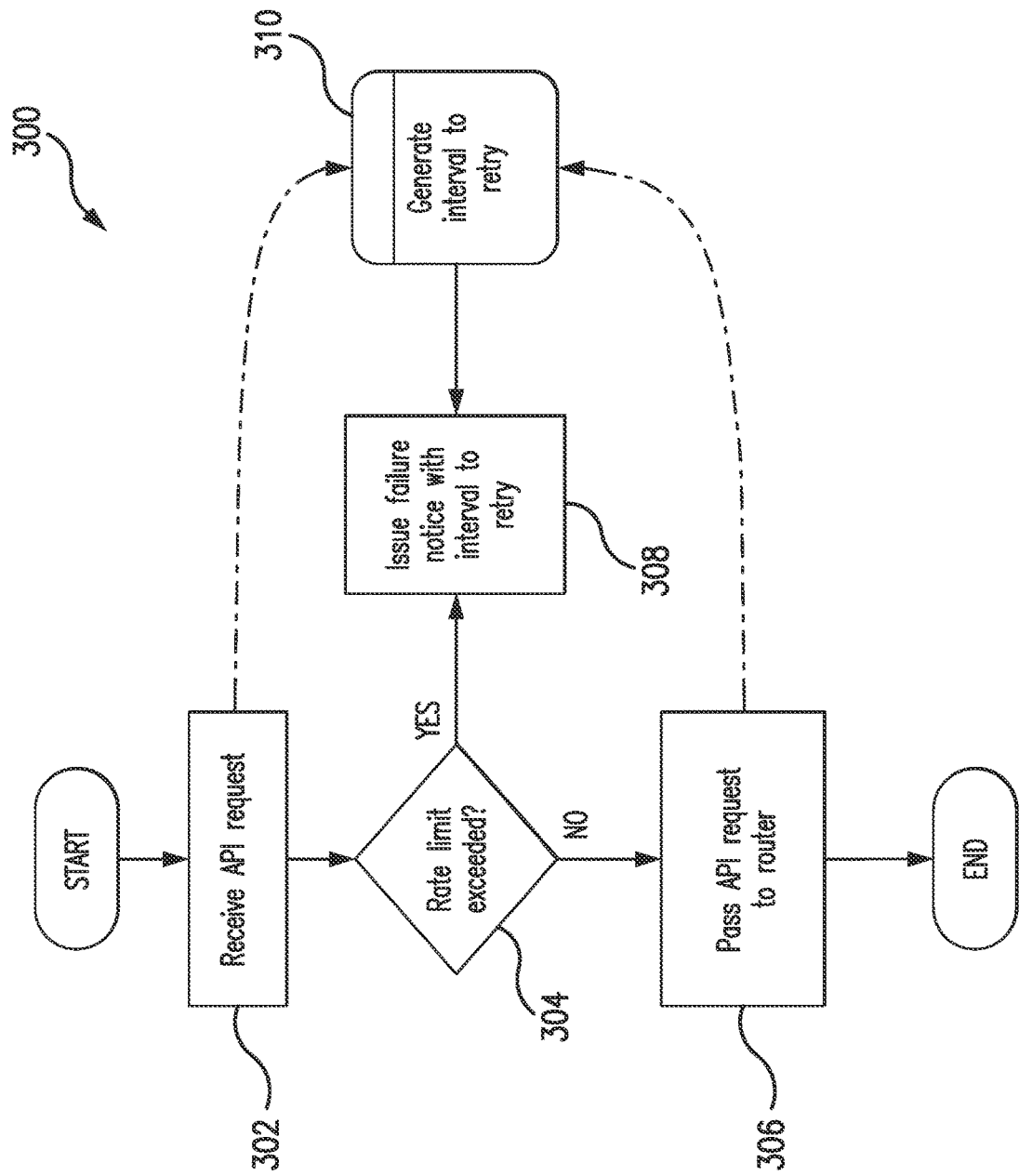
FIG. 3 is an example method, which may be implemented in the system of FIG. 1, for directing a retry request for network content, by a user device, based on an interval defined by one or more network conditions.

FIG. 3 illustrates an example method 300 for use in directing retry attempts to specific intervals, based on present and forecasted network conditions. The example method 300 is described as implemented in the system 100 and the computing device 200. The methods herein should not be understood to be limited to the example system 100, though, or the example computing device 200. Likewise, the systems and the computing devices herein should not be understood to be limited to the example method 300.

Referring to FIG. 3, at 302, an API request (or call) is received from a computing device, such as, for example, the mobile device 102. In this example, again, the network 120 includes a payment network and the API request includes a request for transaction details, which is associated with a get_transaction API. That said, it should be appreciated that the network 120 in general, and more particularly the edge device 116 and/or engine 118, generates notifications for every transaction for the mobile device 102 (and other devices) so that the mobile device 102 can retrieve transaction details from the network 120. In that sense, the method 300 is based on such notifications.

The edge device 116 of the network 120 receives the API request and, at 304, determines whether the API request exceeds the predefined rate limit set for the edge device 116 (and network 120). In response to the predefined rate limit being not exceeded, the edge device 116 passes the API request to the router 106, at 306. The requested transaction details are then returned to the mobile device 102, for example, by one of the machines 112 and 114.

Conversely, in response to the predefined rate limit being exceeded at 304, the edge device 116 issues a failure notice with an interval to retry, at 308. And, the edge device 116 transmits the failure notice, with the appended interval, to the mobile device 102. In this example embodiment, the edge device 116 issues a 429-error message to the mobile device 102, for example, which includes the interval to retry in the header of the message.

Figure 4:
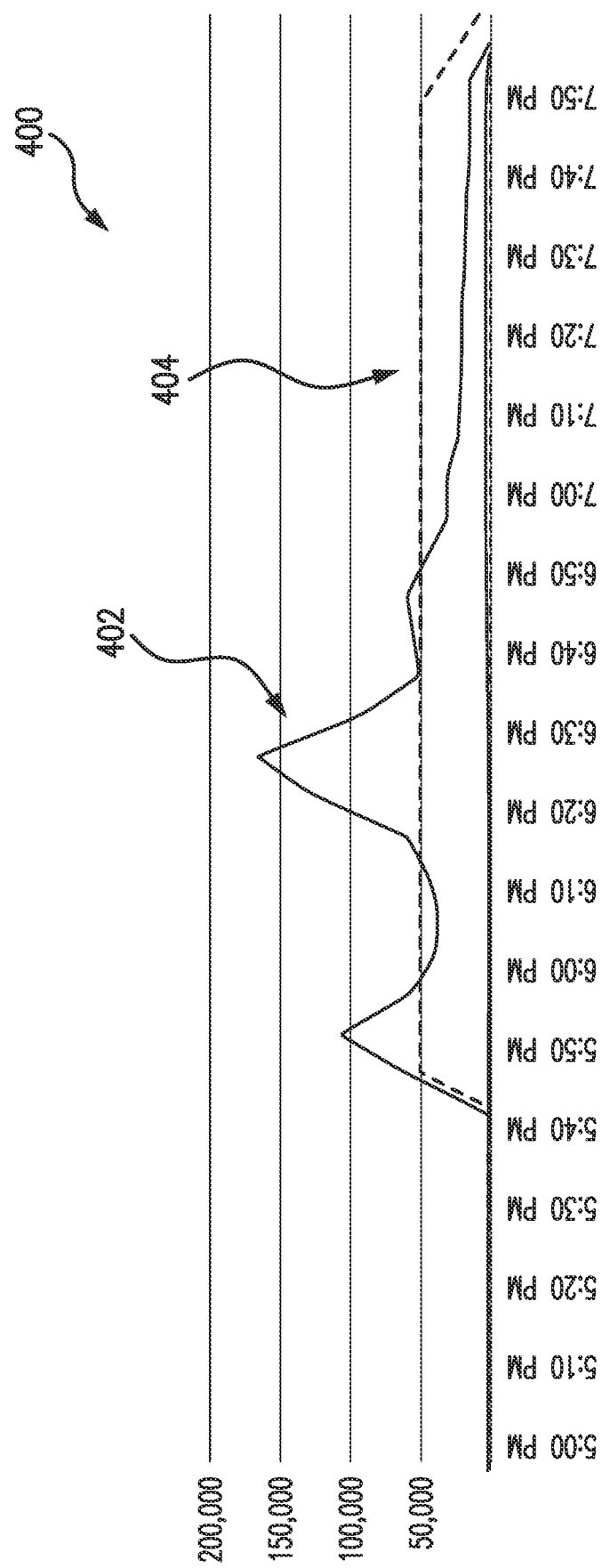
FIG. 4 is an example graphical representation of a rate limit imposed on application programming interface (API) requests to a network.

FIG. 4 graphically illustrates at 400 an example rate of API requests to the edge device 116 over a time interval from 5:00 PM to 7:50 PM. As shown, the number of API requests, referenced 402, is fairly minimal in this example until about 5:40 PM, at which point the number of API requests 402 increases rapidly to over 100,000 API requests at about 5:50 PM and to a peak of over 150,000 API requests at about 6:30 PM. This could be the result of a downed service or restricted data structure upon which the get_transaction API relies. As such, at about 5:47 PM, a predefined limit of 50,000 API requests (referenced 404) is reached, and after that the further received API requests will exceed the predefined rate limit. Consequently, as included in method 300, failure notices will be issued for each of the requests exceeding the predefined rate limit. In so doing, the API requests received in excess of the rate limit are rescheduled for a next later time interval, and further next later time intervals, as needed, whereby the spikes in API requests (as generally noted at 402) may be equalized (as noted at 404). In this manner, the present disclosure provides for smoothing (or equalizing) of API requests over time to avoid (e.g., inhibit, etc.) adverse effects on the network 120 resulting from such spikes in API requests (e.g., helping inhibit the network 120 from becoming overwhelmed, damaged, etc. by the excess API requests, and/or helping inhibit degradation of network performance, etc.).

With reference again to FIG. 3, in connection with issuing the failure notice, the edge device 116 also generates the interval to retry, at 310, which is included in the failure notice (e.g., appended to a header of the failure notice (e.g., try again in 60 seconds, etc.), etc.). In particular, the edge device 116 compiles data related to the received API request, including, for example, a current rate of API requests (e.g., as shown in FIG. 4, etc.), a number of new and retried API requests, a number of satisfied API requests, etc. In addition, the edge device 116 determines an expected number of API requests over an interval. For instance, network information for each transaction such as transactions per second (TPS), timestamps, success/retry results at the edge device 116, etc. are streamed to a datastore and processed to time series data through the engine 118 for use in the model calculations. The above data may be considered the conditions of the network 120 shown in FIG. 1. It should be appreciated that the edge device 116 generates the interval to retry for each API request that exceeds the rate limit of the edge device 116.

Based on the compiled and determined conditions of the network 120, the edge device 116 may employ machine learning techniques (e.g., time series forecasting, etc.) to generate the numbers of predicted API requests and/or to predict an optimized retry time interval for the return API request that has exceeded rate limit. Such machine learning techniques may help to learn and fit application behaviors of the network 120 and thereby enable the edge device 116 (and/or engine 118) to predict future volumes which, for example, may be for a next ten to fifteen minutes based on historic trends, seasonality and rate limit considerations. Effectively, the next optimized retry interval may then be ten seconds from now, instead of immediately (as is conventional) or instead of waiting (as also is conventional) a generic predefined (or constant) time interval such as twenty minutes (which, in both cases, doesn't guarantee that the service can be fulfilled, despite the wait and retry, as there may be multiple other requests that retry at the same interval together with new incoming requests).

That said, as an example, considering the example data in Table 1, the rate limit of the edge device 116 of the network 120 may be 14,000 API requests. In connection therewith, at each of the timestamps leading up to 12:11:15, the number of actual API requests observed at the edge device 116 was less than 14,000 (i.e., was less than the rate limit). As such, each of the received API requests was passed to the router 106. However, at timestamps 12:11:15 and 12:11:30, the number of actual API requests observed at the edge device 116 hit (and exceeded) the rate limit of 14,000 (where, in this example, 15,000 API requests were actually observed at the edge device 116 for the timestamp 12:11:15). At this point, for the timestamp, any further incoming requests (i.e., the 1,000 extra requests beyond the 14,000 rate limit) are each responded to with a failure notice (e.g., a 429 retry response, etc.) including a time to retry the request.

To determine the time to retry the further incoming requests for the timestamp 12:11:15, in this example, the engine 118 identifies the number of excess requests for the timestamp (i.e., 1,000 requests) and then determines a capacity of the next time interval based on a difference between the time series prediction for the next temporal timestamp 12:11:30 and the rate limit (i.e., 14,000-13,509 indicating a capacity of 491 requests). As such, the engine 118 determines the time to retry for the first 491 of the excess requests to be 15 seconds (such that these requests are retried at the timestamp 12:11:30). The engine 118 then further determines the capacity of the next time interval (timestamp 12:11:45), based on a difference between the time series prediction of the timestamp 12:11:45 and the rate limit (i.e., 14,000-13,367 indicating a capacity of 633 requests). The engine 118 thus determines the time to retry for the remaining 509 of the excess requests to be 30 seconds. In this way, retry attempts for the 1,000 excess API requests from the timestamp 12:11:15 are spread over the next two timestamps.

Further in this example, at the timestamp 12:11:30, the number of actual API requests observed at the edge device 116 again hit the rate limit of 14,000 (for example, where, 14,630 API requests were actually observed at the edge device 116). At this point, any incoming requests beyond the 14,000 rate limit (i.e., the 630 extra requests beyond the 14,000 rate limit) are responded to with a failure notice (e.g., a 429 retry response, etc.) including a time to retry the requests. Here, the engine 118 determines the time to retry these further incoming requests by looking ahead at the time series prediction numbers for the next in line timestamp 12:11:45 (i.e., 13,367). The time series prediction is also impacted by the 509 excess API requests retried from the timestamp 12:11:15. As such, the capacity of timestamp 12:11:45 is actually only 124 API requests (14,000−13,367−509). As such, the engine 118 determines the time to retry for the first 124 of the excess requests to be 15 seconds. The engine 118 then further determines the capacity of the next time interval in line, timestamp 12:12:00, based on a difference between the time series prediction of the timestamp 12:12:00 and the rate limit (i.e., 14,000-12,472 indicating a capacity of 1,528 requests). The engine 118 thus determines the time to retry for the remaining excess 506 requests from the timestamp 12:11:30 to be 30 seconds. In this way, retry attempts for the 630 excess API requests from the timestamp 12:11:30 are pushed to the timestamp 12:11:45 and the timestamp 12:12:00.

In the above example, the excess API requests submitted to the network 120 (as observed by the edge device 116 at timestamp 12:11:15 and timestamp 12:11:30 (where the total API requests submitted to the network 120 exceeded the rate limit of 14,000 requests for the network 120)) are carried out (or temporally distributed) over multiple later timestamps, resulting in a smoothing of the requests over time. That said, while the above example describes determination of the time to retry in a dynamic manner, it should be appreciated that in some embodiments the time to retry the excess API requests may instead be a static configuration (e.g., a time to retry of 30 seconds, 60 seconds, etc.). In addition, in some embodiments, the time to retry excess API requests may be determined by way of a combination of both static configurations and dynamic configurations (e.g., where a static configuration may initially be applied and then modified to a dynamic configuration if the static configuration results in a further failure notice, etc.). Additionally, the time to retry may be determined based on a remaining time in a current interval and adjusted to correspond to a time associated with a start of a future interval (such that the retry requests are received toward a beginning of the future interval and are more likely to be successful). What's more, in some embodiments, the time to retry may be revised over time, with the revised time to retry then transmitted to the mobile device 102 as needed.

In view of the above, the systems, networks, and methods herein provide for distributing API requests over time, in particular when the API calls exceed rate limits of networks. In so doing, spikes of API requests that may adversely affect operation of the networks may be inhibited. As can be appreciated, this may ultimately provide for improved reliability in operation of the networks, and reduction in downtime and maintenance.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of: (a) receiving, at an edge computing device of a network, from a computing device, an application programming interface (API) request to the network for content; (b) determining, by the edge computing device, whether the API request exceeds a predefined rate limit of API requests for the network; (c) in response to the API request exceeding the predefined rate limit, calculating, by the edge computing device, an interval to retry the API request based on one or more conditions of the network, the one or more conditions including the predefined rate limit of API requests for the network and a number of expected API requests for an upcoming interval; (d) appending, by the edge computing device, the interval to retry to a failure notice; (e) transmitting, by the edge computing device, the failure notice with the appended interval to retry to the computing device, thereby indicating to the computing device to retry the API request based on the interval to retry rather than immediately or rather than at another preset interval of the computing device; (f) in response to the API request not exceeding the predefined rate limit, retrieving the content identified in the API request and transmitting the content to the computing device; and/or (g) repeating (a) through (g) for each received API request.

With that said, example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
receiving, at an edge computing device of a network, from multiple computing devices, multiple application programming interface (API) requests to the network for content;
calculating, at one or more regular time intervals, by the edge computing device, i) a number of expected API requests, for an upcoming interval, based in a time series forecasting model and time series data indicative of historical API requests to the network and ii) an interval to retry the API requests based on multiple conditions of the network, the multiple conditions of the network including a predefined rate limit of API requests for the network and the number of expected API requests for the upcoming interval;
determining, by the edge computing device, ones of the multiple API requests in excess of the predefined rate limit of API requests for the network;
appending, by the edge computing device, the interval to retry to failure notices for the ones of the multiple API request in excess of the predefined rate limit of API requests for the network; and transmitting, by the edge computing device, the failure notices to the multiple computing devices, respectively, thereby indicating to the multiple computing devices to retry the API requests based on the interval to retry.

2. The computer-implemented method of claim 1, wherein the multiple API requests includes multiple requests for transaction data from a data center of the network.

3. The computer-implemented method of claim 1, wherein calculating the interval to retry is based on machine learning.

4. The computer-implemented method of claim 1, wherein appending the interval to retry to the failure notices includes appending the interval to retry to a header of each of the failure notices.

5. The computer-implemented method of claim 4, wherein the failure notices each include a 429-error message.

6. The computer-implemented method of claim 1, wherein the multiple conditions of the network further include a current rate of API requests received at the edge computing device.

7. A non-transitory computer-readable storage medium comprising computer-executable instructions for directing retry requests for content from a network, which when executed by at least one processor of the network, cause the at least one processor to:

receive, from multiple computing devices, multiple application programming interface (API) requests to the network for content;

calculate, at one or more regular time intervals, i) a number of expected API requests, for an upcoming interval, based in a time series forecasting model and time series data indicative of historical API requests to the network and ii) an interval to retry the API requests based on multiple conditions of the network, the multiple conditions of the network including a predefined rate limit of API requests for the network and the number of expected API requests for the upcoming interval;

determine ones of the multiple API requests exceed a predefined rate limit of API requests for the network;

in response to ones of the multiple API requests not exceeding the predefined rate limit, retrieve the content identified in said ones of the multiple API requests and transmit the content to the multiple computing devices, respectively; and in response to determining that the ones of the multiple API requests exceed the predefined rate limit:

generate a failure notice for each of the ones of the API requests that exceed the predefined rate limit and append the interval to retry to a header of each of the failure notices; and transmit the failure notices to the multiple computing devices, respectively, thereby indicating to the multiple computing devices to retry the API requests based on the interval to retry.

8. The non-transitory computer-readable storage medium of claim 7, wherein the executable instructions, when executed by the at least one processor to calculate the interval to retry, cause the at least one processor to dynamically calculate the interval to retry.

9. The non-transitory computer-readable storage medium of claim 8, wherein the time series forecasting model includes a piecewise linear growth curve trend with yearly-seasonal and weekly-seasonal components.

10. The non-transitory computer-readable storage medium of claim 8, wherein the failure notices each include a 429-error message.

11. The non-transitory computer-readable storage medium of claim 8, wherein the multiple conditions of the network further include a current rate of API requests received at the network.

12. The non-transitory computer-readable storage medium of claim 11, wherein the multiple API requests includes multiple requests for transaction data from a data center of the network.

* * * * *